Jan. 28, 1958     W. H. PHILLIPS     2,821,352
SERVO-VANE CONTROL FOR AIRCRAFT
Filed Aug. 13, 1954
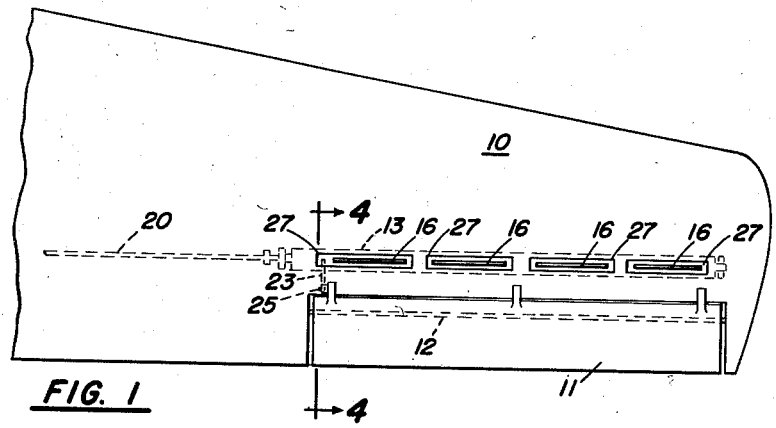
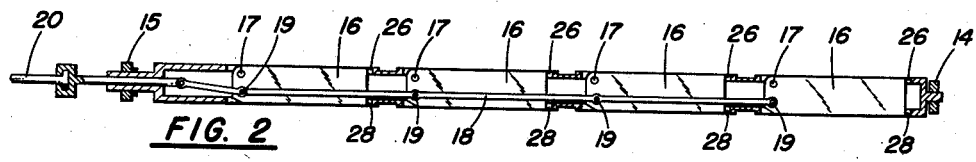
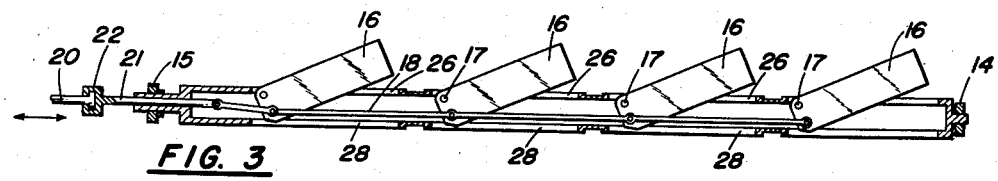
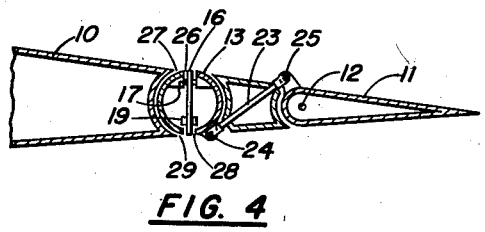
INVENTOR
WILLIAM H. PHILLIPS
BY
ATTORNEYS

United States Patent Office 2,821,352
Patented Jan. 28, 1958

2,821,352
SERVO-VANE CONTROL FOR AIRCRAFT

William H. Phillips, Hampton, Va.

Application April 13, 1954, Serial No. 423,002

7 Claims. (Cl. 244—90)

(Granted under Title 35, U. S. Code (1952), sec. 266)

The invention described herein may be used by and for the Government for governmental purposes without the payment of any royalty thereon.

This invention relates to a means for operating the control surfaces of an airplane with relatively small control forces and adequate control effectiveness at transonic and supersonic speeds.

Existing airplanes intended for flight at subsonic speeds are ordinarily equipped with flap-type control surfaces. In order to reduce the control forces to an acceptable value, these control surfaces are usually equipped with aerodynamic balance in the form of overhanging balance, horn balance, balancing tabs, etc. In the case of large airplanes where still further reduction of control forces is necessary, an aerodynamic servo control, usually known as a servo-tab or spring-tab, is frequently used. Hydraulic or electrical control boosters have been used in airplanes designed to fly at transonic or supersonic speeds because the hinge moments required on the control surfaces far exceed the strength of an operator.

Both the conventional aerodynamic balance and the servo-tab, or spring-tab, controls fail to operate properly in the transonic and supersonic speed ranges because the amount of aerodynamic balance required increases greatly in these speed ranges, and in the case of the servo-tab or spring-tab control, because the tab effectiveness decreases and the amount of tab deflection required becomes so great that the effect of the tab approximately offsets the lift supplied by the control surface. The electrical or hydraulic boosters do not suffer from the same disadvantages as the aerodynamic balance or spring-tabs, but the use of such control boosters are undesirable because of their weight, mechanical complexity and lack of reliability as compared with conventional aerodynamically balanced control systems.

Servo-tab or spring-tab controls are generally recognized to possess the advantage of simplicity and reliability when compared to electrical or hydraulic control boosters. The simplicity of the servo-vane control system of this invention is comparable to that of the servo-tab or spring-tab controls. The control effectiveness of the proposed control would be expected to be retained at transonic and supersonic speeds in contrast to the loss of effectiveness exhibited by the spring-tab and servo-tab controls. Adequate effectiveness of the control of this invention at transonic and supersonic speeds results because the drag forces on the vanes which provide the force for deflecting the control surface are undiminished at transonic and supersonic speeds. In addition, the servo-vane control provides an unusually powerful control for three reasons: First, the vane acts as a spoiler and provides by itself an increment of lift in the desired direction. This action is unlike that of the servo-tab where the tab gives lift in the wrong direction. Second, the reduced pressure behind the vanes assists the vane in deflecting the control surface and allows large deflection to be obtained. Third, this reduced pressure behind the vane aids in preventing separation of flow over the flap and therefore allows the effectiveness to increase linearly to large deflections.

It is an object of this invention, therefore, to provide a system for obtaining a large part of the control operating forces of control surfaces aerodynamically while still maintaining control effectiveness throughout the speed ranges.

Another object of this invention is the provision of a series of vanes in the wing of an aircraft, and which when projected from the surfaces of the wing are caused to rotate by drag forces and thus rotate the control surfaces of the aircraft through a mechanical linkage.

Other and more specific objects and advantages of this invention will become apparent after a careful consideration of the following detailed description and the appended claims, taken in connection with the accompanying drawings in which:

Fig. 1 is a plan view showing a control surface on the wing of an aircraft, and the servo-vane control for said control surface;

Fig. 2 is an enlarged cross sectional view of the servo-vane controls in an inoperative position;

Fig. 3 is a view similar to Fig. 2 showing the servo-vanes in an operative position for deflecting the control surface; and Fig. 4 is an enlarged cross sectional view taken through the line 4—4 of Fig. 1.

Reference is now made to the drawings, wherein a portion of a wing 10 is illustrated. A control surface, flap or aileron 11, is pivotally secured in any convenient manner, to the wing 10 by means of a shaft 12. The servo-vane control of this invention is employed to rotate the surface 11 relative to the wing 10 about the axis of the shaft 12.

The servo-vane control comprises a cylindrical torque or vane tube 13 rotatably mounted within the wing 10. As most clearly seen in Figs. 2 and 3, the torque tube 13 is supported at one end by a bearing 14, and at the other end by a bearing 15. The longitudinal axis of the torque tube 13 is parallel to the shaft 12 and the vane tube is free to rotate within the bearings 14 and 15, about said axis. A series of vanes 16 are pivotally mounted by means of pins 17 to an inner portion of the torque tube. A rod 18 is pivotally coupled to each of the vanes by means of pins 19, as shown, and a pushrod 20 is coupled to the rod 18 through a shaft 21. The coupling between the shaft 21 and the pushrod 20 comprises a thrust bearing 22. The outer surface of the thrust bearing 22 is mounted within the wing 10 and is adapted for longitudinal motion in the direction of the arrows, as well as for rotation about the axis of the torque tube 13. The thrust bearing is restrained, however, from radial motion relative to the tube. The inner surface of the thrust bearing 22 provides for the rotation of the shaft 21 with respect to the pushrod 20.

A link 23 is pivotally connected at one end to a portion of the torque tube 13 by any suitable means 24, and at its other end to the control surface or flap 11 by a suitable means 25. While only one link 23 has been illustrated, it is apparent that several links may be spaced along the span of the control surface to transmit the torque from the tube 13. It is also clear that other types of linkage, such as gearing, may be employed.

A series of longitudinal slots 26 are provided in the torque tube 13 adjacent each vane 16, and are positioned opposite a corresponding series of wider slots 27 in the upper surface of the wing 10. A similar series of slots 28 are provided in the wall of tube 13 diametrically opposite the slots 26 and are positioned opposite the corresponding series of wider slots 29 in the lower surface of the wing 10.

The vanes 16 are operated by the pushrod 20, which is moved into and out of the torque tube 13 by pressure exerted by the operator of the aircraft. The bearings 14 and 15, which are fixed to the wing structure, permit the rotation of the torque tube 13 about an axis parallel to the shaft 12. The control pushrod 20, when moved by the operator, enters the vane tube along the axis thereof and because of the use of the thrust bearing 22, the pushrod does not interfere with the rotation of the vane tube. Deflection of the pushrod 20 causes the projection of the vanes 16 through the slots 26 or 28, depending on direction of deflection, and through the wider slots 27 or 29 in the wing 10. Drag forces on the vanes 16 cause the torque tube 13 to rotate and the rotation of the torque tube is transmitted through the link 23 to the control surface or flap 11. It is seen when the vanes 16 are projected up from the surface of the wing 10, the tube 13 will rotate in a clockwise direction to produce counterclockwise rotation of the control surface 11. On the other hand, clockwise rotation of the control surface 11 will result when the vanes 16 are projected down from the surface of the wing 10.

In the embodiment illustrated, the vanes 16 of the system are shown as being located inside a torque or vane tube 13, which runs approximately parallel to the shaft of the control surface. Alternatively, the torque tube may be located over some other portion of the wing span than that occupied by the control surface. The alternative arrangements are advantageous on subsonic airplanes because of the smaller interference effects between the vanes and the control surface, and because the assistance of reduced pressure behind the vanes in deflecting the control surface is not needed at subsonic speed.

While certain preferred embodiments of this invention have been illustrated and described, many variations and modifications will become readily apparent to those skilled in the art. It is the intent, therefore, that this invention shall not be limited except by the prior art, and by the scope and spirit of the appended claims.

What is claimed is:

1. In an aircraft having a wing and a movable control surface hinged on said wing, a servo-vane control system for said control surface comprising: a torque tube mounted for rotation in said wing; a mechanical linkage between said torque tube and said control surface, whereby rotary motion of said torque tube is transmitted to said control surface; a first longitudinal slot in said torque tube; a second longitudinal slot in said wing adjacent said first slot; a vane pivoted in said torque tube; and means for rotating said vane for projecting the vane through said slots.

2. In an aircraft having a wing and a control surface mounted on said wing for rotation relative thereto, about an axis perpendicular to the line of flight of the aircraft, a servo-vane control system for said control surface comprising: a torque tube rotatably mounted in said wing; a slot in said wing; a vane pivotally mounted on said tube; means for pivoting said vane through said slot whereby aerodynamic drag causes the rotation of said vane and said tube; and means coupling said tube to said control surface for transmitting rotation of said tube to said control surface.

3. An aerodynamic control for operating the movable control surfaces in the wing of an aircraft comprising: a vane, means mounting said vane for movement from an inoperative position wherein said vane is not subject to aerodynamic drag to an operative position wherein said vane is subject to aerodynamic drag, means mounting said vane for rotation about an axis perpendicular to the line of flight of said aircraft; means connected to said vane, only, to move said vane between said operative and inoperative positions and means transmitting the rotation of said vane to said control surface; whereby said control surface will be operated in response to the aerodynamic drag on said vane.

4. A system for operating the movable control surfaces in the wing of an aircraft in flight comprising: a torque transmitting member rotatably mounted in said wing with its axis of rotation perpendicular to the line of flight of said aircraft; a torque receiving member pivoted on said torque transmitting member and normally disposed wholly within said wing; means for projecting said torque receiving member from within said wing into the airstream of said aircraft above or below said wing, whereby aerodynamic drag will cause the rotation of said members about said axis; and means coupling said torque transmitting member to said control surfaces.

5. A system for operating the control surfaces on the wing of an aircraft comprising: a torque tube rotatably mounted within said wing; a first pair of slots longitudinally disposed on diametrically opposite walls of said tube; a second pair of slots disposed in the upper and lower surfaces of said wing adjacent said first pair of slots; a series of vanes aligned with said slots and pivotally mounted within said tube; means for pivoting said vanes to project through the upper or lower of said slots; whereby aerodynamic drag on said vane causes rotation of said tube within said wing; and means linking said tube and said control surfaces.

6. An aerodynamic control for operating a movable control surface in the wing of an aircraft comprising a vane, means mounting said vane for a first movement from an inoperative position wherein said vane is not subject to aerodynamic drag to an operative position in which it is subject to aerodynamic drag, means mounting said vane for a second movement under the urging of aerodynamic drag, a control surface, and means connecting said vane to said control surface for movement of said control surface in response only to the second movement of said vane, whereby upon movement of said vane into operative position, said vane will be urged by aerodynamic drag force to move said control surface as the sole source of power for said control surface.

7. An aerodynamic control for operating a movable control surface in a wing comprising a wing, a vane, means mounting said vane on said wing for movement from an inoperative position wherein said vane is not subject to aerodynamic drag to an operative position wherein it is subject to aerodynamic drag, means mounting said vane for movement under the influence of aerodynamic drag, a control surface movably mounted on said wing, and means connecting said vane to said control surface for movement of said control surface upon said second mentioned movement of said vane.

References Cited in the file of this patent

UNITED STATES PATENTS

| 1,875,465 | Klingaman | Sept. 6, 1932 |
| 2,549,760 | Adams | Apr. 24, 1951 |
| 2,597,767 | Ashkenas | May 20, 1952 |

FOREIGN PATENTS

| 883,096 | France | Mar. 15, 1943 |